(12) United States Patent
Kobayashi

(10) Patent No.: US 9,061,640 B2
(45) Date of Patent: Jun. 23, 2015

(54) AIRBAG START-UP DECISION APPARATUS FOR MOTORCYCLE

(71) Applicant: HONDA MOTOR CO., LTD., Tokyo (JP)

(72) Inventor: Yuki Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 205 days.

(21) Appl. No.: 13/893,651

(22) Filed: May 14, 2013

(65) Prior Publication Data

US 2013/0317702 A1    Nov. 28, 2013

(51) Int. Cl.
*B60R 22/00* (2006.01)
*B60R 21/0132* (2006.01)

(52) U.S. Cl.
CPC .................. *B60R 21/0132* (2013.01)

(58) Field of Classification Search
CPC ................ B60R 21/0132; B60R 2021/01327; B60R 2021/01322; B60R 2021/01325; B60R 2021/0102; B60R 2021/01027
USPC .............................................. 701/301, 45–47
See application file for complete search history.

(56) References Cited

U.S. PATENT DOCUMENTS

| | | | |
|---|---|---|---|
| 2002/0069004 A1* | 6/2002 | Marchthaler et al. | 701/49 |
| 2003/0040858 A1* | 2/2003 | Wallace | 701/45 |
| 2005/0195383 A1* | 9/2005 | Breed et al. | 356/4.01 |
| 2005/0278098 A1* | 12/2005 | Breed | 701/45 |
| 2007/0182528 A1* | 8/2007 | Breed et al. | 340/435 |
| 2008/0040004 A1* | 2/2008 | Breed | 701/45 |
| 2008/0046150 A1* | 2/2008 | Breed | 701/45 |
| 2008/0119993 A1* | 5/2008 | Breed | 701/46 |
| 2013/0317702 A1* | 11/2013 | Kobayashi, Yuki | 701/46 |

FOREIGN PATENT DOCUMENTS

| | | |
|---|---|---|
| DE | 3803426 A1 | 8/1989 |
| DE | 10360893 A1 | 7/2005 |
| DE | 60209603 T2 | 8/2006 |
| DE | 60209840 T2 | 8/2006 |
| JP | 2003-237529 | 8/2003 |

\* cited by examiner

*Primary Examiner* — Redhwan K Mawari
(74) *Attorney, Agent, or Firm* — Rankin, Hill & Clark LLP

(57) ABSTRACT

A safing decision is executed using a first integrator for integrating acceleration sensor output values for a first integration interval to obtain a first arithmetic operation value, a second integrator for cumulative integration of the acceleration sensor output values using it as a trigger that the first arithmetic operation value exceeds a first predetermined value to obtain a second arithmetic operation value, a third integrator for integrating the second arithmetic operation value for a third integration interval to obtain a third arithmetic operation value as a second order integration value of the output values of the acceleration sensors, and a comparator for comparing a map derivation value derived by substituting the third arithmetic operation value into a threshold value map and the first arithmetic operation value with each other. The airbag is started up when the main decision and the safing decision are carried out as an on decision.

9 Claims, 8 Drawing Sheets

ADVANCING DIRECTION

UPON COLLISION

AIRBAG START-UP DECISION APPARATUS FOR MOTORCYCLE

BACKGROUND OF THE INVENTION

1. Field of the Invention

The present invention relates to an airbag start-up decision apparatus for a motorcycle, and particularly to an airbag start-up decision apparatus for a motorcycle wherein a start-up decision of an airbag is carried out using two acceleration sensors.

2. Description of Related Art

Conventionally, an airbag start-up decision apparatus decides whether or not an airbag disposed in front of an occupant is to be started up (inflated) in response to an output value of an acceleration sensor attached to a vehicle body. In such a start-up decision apparatus, a safing decision as a failsafe function for preventing an erroneous decision is sometimes applied.

In Japanese Patent Laid-Open No. 2003-237529, a start-up decision apparatus for an airbag of a four-wheel vehicle which has the following configuration is disclosed. In particular, two acceleration sensors (safing sensors) for carrying out a safing decision are provided on the left and right at front portions of a vehicle body are provided in addition to one acceleration sensor (G sensor) for carrying out a start-up decision (main decision) of an airbag. Even if the G sensor outputs a high output, if one or both of the safing sensors do not output a high output, then it is decided that the output of the G sensor arises from an influence of electric noise, and the airbag is not started up.

However, according to the technique disclosed in Japanese Patent Laid-Open No. 2003-237529, since three total acceleration sensors are required, a motorcycle, which has a limited installation space, has a subject in assurance of an installation space and a complicated wiring scheme. Further, increase of the number of sensors gives rise to increase of the number of parts and increase of the labor. Therefore, for an airbag for a motorcycle, a technique is demanded that achieves both a main decision and a safing decision using a minimized number of sensors.

SUMMARY OF THE INVENTION

The present invention is directed toward resolving the problems in the prior art and providing an airbag start-up decision apparatus for a motorcycle that makes it possible to carry out a start-up decision of an airbag, including a safing decision, using two acceleration sensors.

In accordance with the present invention, an airbag start-up decision apparatus for a motorcycle that carries out a start-up decision of whether or not an airbag provided on the motorcycle is to be started up has a first characteristic in that an acceleration, which is an output value of an acceleration sensor attached to the motorcycle, is second-order-integrated for a predetermined integration interval to calculate a displacement, and based on a fact that, upon application to a graph wherein the displacement is taken on the axis of abscissa and the output value is taken on the axis of ordinate, a waveform obtained upon collision exists only in the first quadrant while a waveform obtained in any case other than collision appears in a quadrant different from the first quadrant, it is decided whether or not a state of the motorcycle is that upon collision or that in any case other than collision. Therefore, it is decided whether or not the state of the motorcycle is that upon collision or that in any case other than collision and, based on the output value of the acceleration sensor, it is possible to start up the airbag upon collision and to prevent the airbag from starting up at any time other than upon collision.

In further accordance with the present invention, acceleration, which is the output value of the acceleration sensor attached to the motorcycle, is second-order-integrated for the predetermined integration interval to calculate the displacement, and based on the fact that, upon application to the graph wherein the displacement is taken on the axis of abscissa and the output value is taken on the axis of ordinate, the waveform obtained upon collision exists only in the first quadrant while a waveform obtained upon going over a road step and upon traveling on a rough road appears in the second and fourth quadrants, it is decided whether or not the state of the motorcycle is that upon collision or that upon going over a road step or upon traveling on a rough road. Therefore, based on the output value of the acceleration sensor, it is possible to start up the airbag upon collision and to prevent the airbag from starting up upon going over a road step or upon traveling on a rough road.

In further accordance with the present invention, the airbag start-up decision apparatus includes two acceleration sensors attached one by one to left and right front forks, which support a front wheel of the motorcycle for rotation thereon. A main decision device for carrying out a main decision based on an average value of output values of the two acceleration sensors, and safing decision device for carrying out a safing decision using an arithmetic operation value based on the output values of the two acceleration sensors and a threshold value map determined in advance. The safing decision device is configured to execute the safing decision using first integrator for integrating the output values of the acceleration sensors for a first integration interval to obtain a first arithmetic operation value, second integrator for starting cumulative integration of the output values of the acceleration sensors using it as a trigger that the first arithmetic operation value exceeds a first predetermined value to obtain a second arithmetic operation value, third integrator for integrating the second arithmetic operation value for a third integration interval to obtain a third arithmetic operation value as a second order integration value of the output values of the acceleration sensors, and a comparator for comparing a map derivation value derived by substituting the third arithmetic operation value into the threshold value map and the first arithmetic operation value with each other. The main decision device carries out the main decision as an on decision when the average value exceeds an average value threshold value determined in advance. The safing decision device carrying out the safing decision as an on decision when the first arithmetic operation value exceeds the map derivation value. The start-up decision of the airbag is carried out as an on decision when both of the main decision and the safing decision are carried out as an on decision. Therefore, the start-up decision configured from the main decision and the safing decision can be executed only by using the paired left and right acceleration sensors attached to the front forks. Consequently, the airbag start-up decision having a failsafe function can be carried out using a minimized number of acceleration sensors. Therefore, the degree of vehicle body layout can be enhanced in the motorcycle which is limited in an installation space, and the motorcycle is advantageous also in cost.

In further accordance with the present invention, the third integration interval is set to approximately one half a natural vibration frequency of the front forks. Therefore, although, for example, it can be supposed that also vibration of the front forks which is unnecessary for the collision decision is detected, this can be prevented. Thus, it can be discriminated precisely whether the event in question is collision or any other event during traveling other-than collision. This arises from the fact that, since a vibration frequency of the front forks to be discriminated is known in advance, a displacement waveform of a phase artificially opposite to that of the acceleration is obtained by the setting.

In further accordance with the present invention, the first integration interval is sufficiently shorter than the third integration interval. Therefore, it can be discriminated precisely whether the event in question is collision or any other event during traveling than collision.

In particular, the output value of the acceleration sensor is second-order-integrated in a predetermined interval of integration to calculate a displacement. If this displacement is applied to a graph whose axis of abscissa indicates the displacement and whose axis of ordinate indicates the acceleration, then the waveform upon collision becomes a waveform which exists only in the first quadrant. This waveform upon collision is much different from a waveform upon going over a road step or upon traveling on a rough road in that the latter waveform appears in the second and fourth quadrants. Therefore, a collision state and a road step going over state or a rough road traveling state can be discriminated.

In further accordance with the present invention, the average value threshold value used for the main decision is set higher than the output values of the acceleration sensors of a magnitude with which the safing decision becomes an on decision. Therefore, in such a case that, although the safing decision is an on decision, if the main decision is not an on decision, namely, upon collision at a low speed, it is possible to prevent the airbag from starting up.

In further accordance with the present invention, the two acceleration sensors are configured from a left side acceleration sensor attached to the left front fork and a right side acceleration sensor attached to the right front fork, and the left side acceleration sensor and the right side acceleration sensor are attached such that a sensor axis, which is a detection direction of the acceleration thereby, is directed in a substantially vehicle body forward and backward direction perpendicular to an axial line of the front forks. Therefore, an expanding or contracting motion of the front forks during traveling is not detected by the acceleration sensor. Specifically, since only an acceleration in the substantially vehicle body forward and backward direction necessary for a start-up decision of the airbag is detected, the accuracy of the start-up decision can be enhanced.

In further accordance with the present invention, the safing decision device is provided for each of the two acceleration sensors that carry out a safing decision with regard to the output values of the two acceleration sensors.

Further, ordinary collision and any other event during traveling of the motorcycle (for example, continuous vibration during traveling, a high impact upon going over a road step or traveling on a rough road, a spike-shaped sensor output by noise and so forth) can be discriminated precisely by appropriate setting of the first and third intervals of integration. Therefore, the start-up decision of the airbag is executed by one main decision and two safing decisions, and the accuracy of the start-up decision is enhanced.

DETAILED DESCRIPTION OF THE PREFERRED EMBODIMENT

Figure 1:
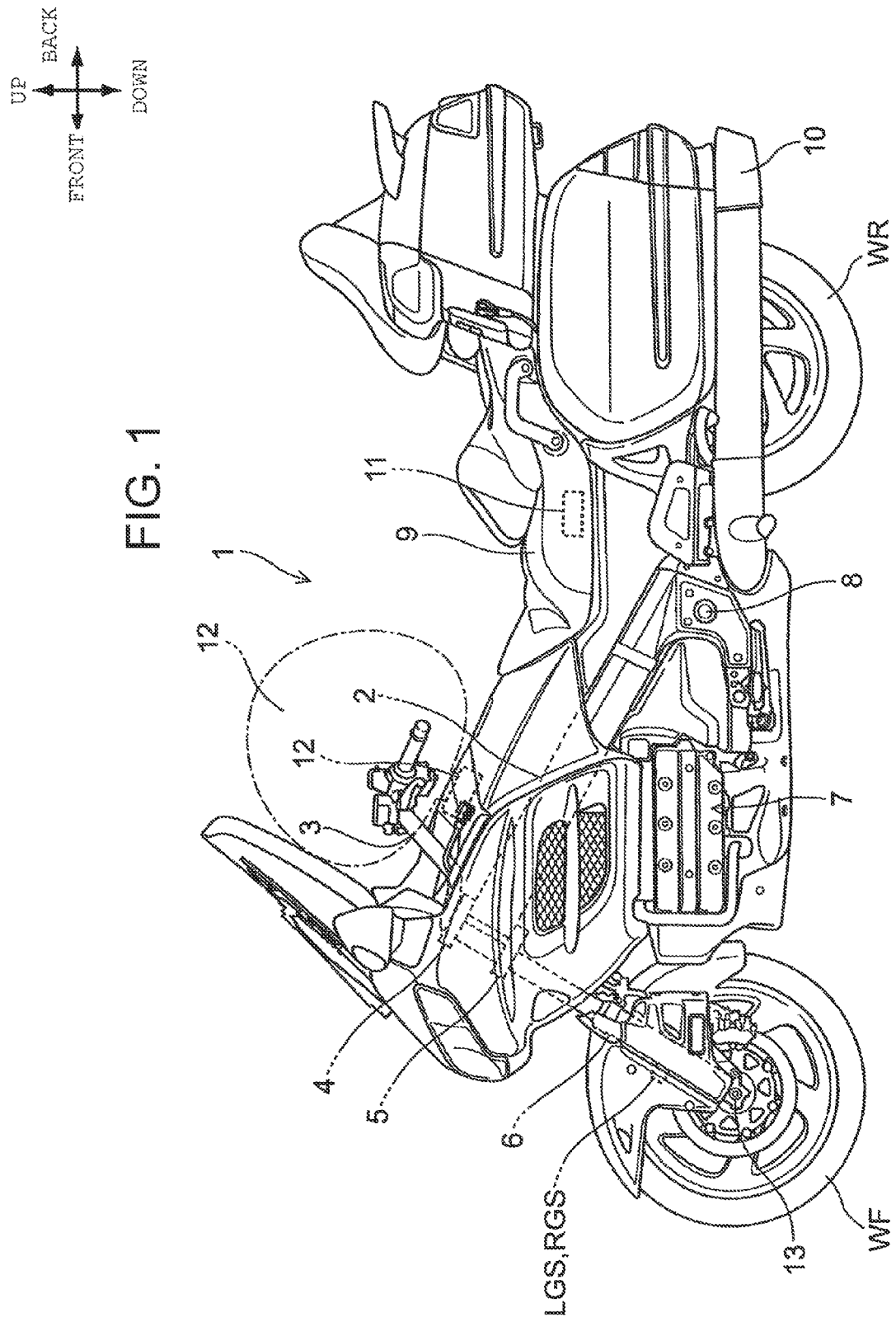
FIG. 1 is a left side elevational view of a motorcycle including an airbag start-up decision apparatus according to the present invention.

In the following, a preferred embodiment of the present invention is described in detail with reference to the drawings. FIG. 1 is a left side elevational view to which an airbag start-up decision apparatus for a motorcycle 1 according to an embodiment of the present invention is applied. Left and right front forks 6 are supported for steering movement at a front end portion of a vehicle body frame 2 of the motorcycle 1 and support a front wheel WF for rotation thereon by an axle 13. The front forks 6 are disposed in a spaced relationship by a predetermined distance in a vehicle widthwise direction from each other and are supported at upper portions thereof on a top bridge 4 and a bottom bridge 5. A steering handlebar 3 is fixed to an upper portion of the top bridge 4. The top bridge 4 and the bottom bridge 5 are connected to each other by a stemshaft (not shown) disposed in parallel to the front forks 6. The stemshaft is supported for rotation on a head pipe at a front end portion of the vehicle body frame 2 to support the front wheel WF for steering movement by the steering handlebar 3.

An engine 7 is attached to a position of a lower portion of the vehicle body frame 2 behind the front wheel WF. Further, a swing arm (not shown) is supported for rocking motion at a rear end portion of the vehicle body frame 2 by a pivot shaft 8 and supports a rear wheel WR serving as a driving wheel for rotation thereon. An exhaust system 10 is disposed on the left and the right of the swing arm in the vehicle widthwise direction. A seat 9 is disposed at a position behind the steering handlebar 3 above the pivot shaft 8.

An airbag 12 is provided at a central position of the motorcycle 1 in the vehicle widthwise direction between the seat 9 and the steering handlebar 3. Before the airbag 12 is inflated and expanded (started up) under a predetermined condition, it is folded to a small size and accommodated as a box-shaped module on the inner side of an exterior part.

In the present embodiment, the decision of whether or not the airbag 12 is to be inflated or started up is executed based on output signals of acceleration sensors LGS and RGS attached one by one to the left and right front forks 6. The output signals of the acceleration sensors LGS and RGS are transmitted to an airbag start-up decision apparatus 11, which serves as a controller. If the airbag start-up decision apparatus 11 decides based on the output signals of the acceleration sensors LGS and RGS that the airbag 12 is in a state in which start-up thereof is required, then it transmits an ignition signal to an inflator of a gas generator that generates inflation gas.

Figure 2:
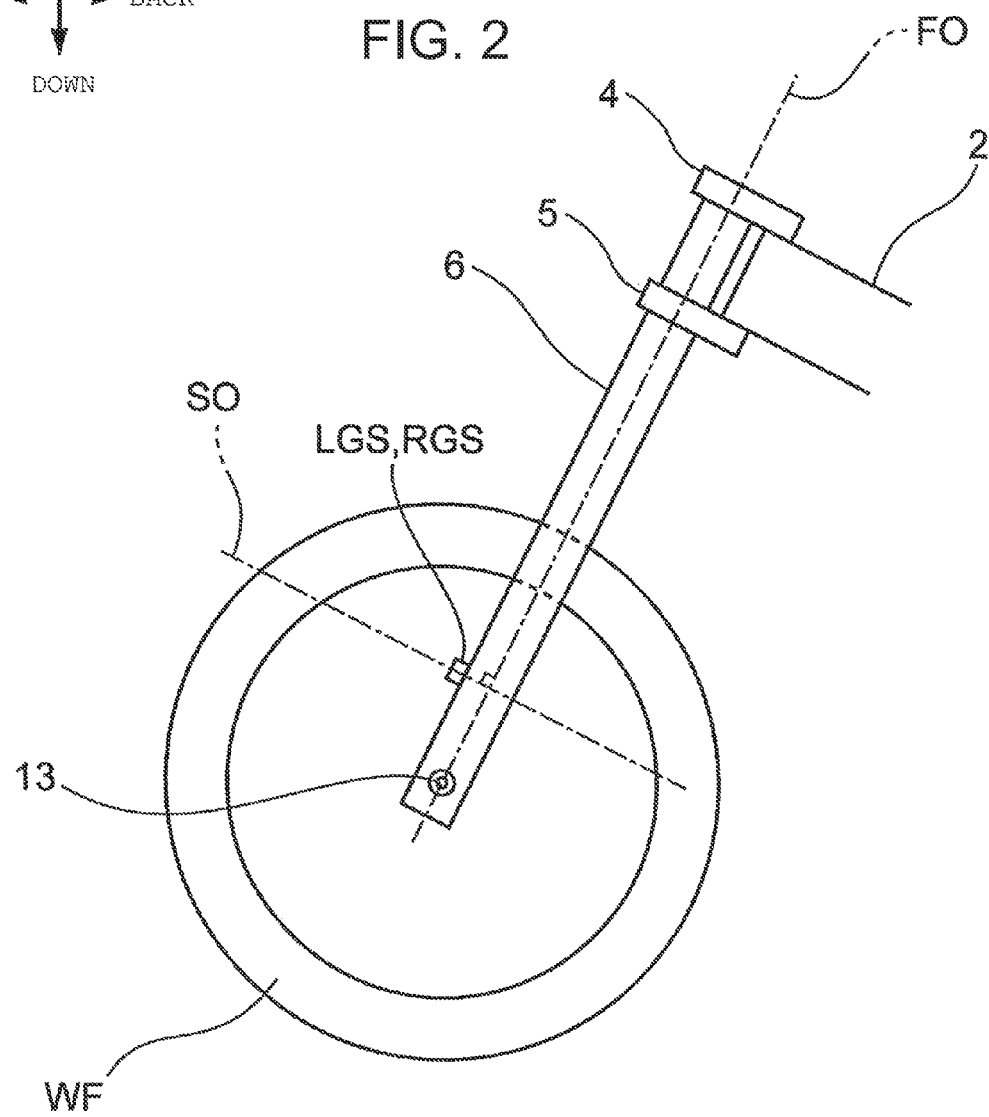
FIG. 2 is an enlarged schematic view of front forks and associated members.

FIG. 2 is an expanded schematic view of the front forks 6 and associated members. As described hereinabove, the acceleration sensors LGS and RGS are attached to positions of a left side tube and a right side tube of the front forks 6, which are leftwardly and rightwardly symmetrical positions, respectively. The front forks 6 are a steering mechanism for the front wheel WF and also function as shock absorbers that extend and contract along an axial line FO thereof.

The acceleration sensors LGS and RGS are each attached such that a sensor axis SO which is an acceleration detection direction thereof is directed in a substantially forward and backward direction of the vehicle body, perpendicular to the axial line FO of the front forks 6.

Here, as described hereinabove, the airbag start-up decision apparatus preferably adopts a safing decision as a failsafe function for preventing an erroneous decision. Since the objective of the safing decision is a failsafe function of a main decision for carrying out an airbag start-up decision, it is a condition that, if the main decision normally decides a collision, then start-up of the airbag 12 is not disturbed. Therefore, the sensitivity to the safing decision is set higher than that of the main decision. However, such a characteristic is required that, the safing decision does not make an on decision in response to an impact that is within a range of ordinary traveling of the motorcycle (an off decision is maintained) and besides, upon collision, an on decision is carried out quickly.

In particular, it is demanded that, in the safing decision, even if an acceleration of an equal magnitude is inputted, it can be decided definitely whether start-up of the airbag 12 is required or, since the acceleration is originated from a vibration caused upon going over a road step or by a rough road, start-up is not required.

On the other hand, in a configuration wherein the acceleration sensors LGS and RGS are attached to the left and right front forks 6, respectively, when the motorcycle collides with a side face of a four-wheel vehicle or the like which is traveling, the front wheel WF may be compulsorily steered to the advancing direction of the four-wheel vehicle or the like. Thereupon, there is the possibility that a difference may arise between the left and right acceleration sensors LGS and RGS. In order to cope with the output difference, it seems a possible idea to use an average value of the two sensor outputs. After all, this is equivalent to use a single sensor output. Also there is a demand to control the start-up decision of the airbag 12 so that, even in the same collision state, the airbag 12 is not started upon collision at a comparatively low speed of the motorcycle.

The airbag start-up decision apparatus 11 according to the present embodiment makes it possible to achieve an airbag start-up decision apparatus that satisfies all of the demands described above using the two acceleration sensors LGS and RGS.

In the following, a technique of discriminating between a collision state, a road step going over state, and a rough road traveling state of the motorcycle based on outputs of the two acceleration sensors LGS and RGS is described. Each of the front forks 6 is an upright front fork wherein an inner tube thereof on the upper side of the vehicle body is engaged with an outer tube thereof. The acceleration sensors LGS and RGS are attached at the low end parts thereof to a front face, with respect to the vehicle body, of the outer tubes which support the front wheel WF for rotation thereon. Accordingly, the acceleration sensors LGS and RGS move back and forth in the direction of the axial line FO in response to expanding and contracting movement of the front forks 6.

However, the acceleration sensors LGS and RGS are attached such that the sensor axes SO that make a detection direction of an acceleration thereof are directed substantially in the vehicle body forward and backward direction perpendicular to the axial lines FO of the front forks 6 as shown in FIG. 2. Therefore, the expanding and contracting movements of the front forks 6 are not detected, but only an acceleration that is generated substantially in the vehicle body forward and backward direction and is required for a start-up decision of the airbag 12.

Figure 3:
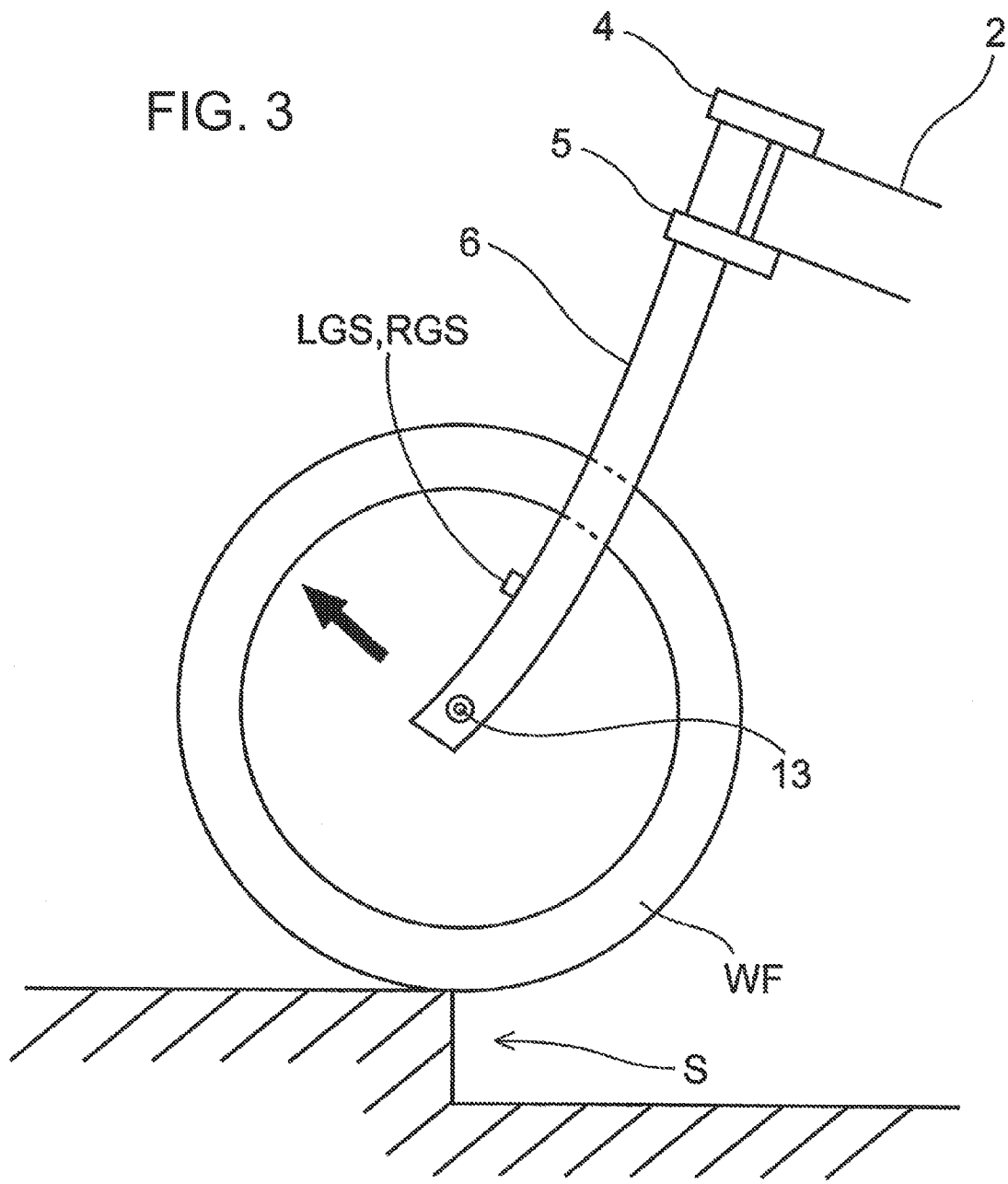
FIG. 3 is a schematic view illustrating a state of the front forks and associated members upon going over a road step.
Figure 4:
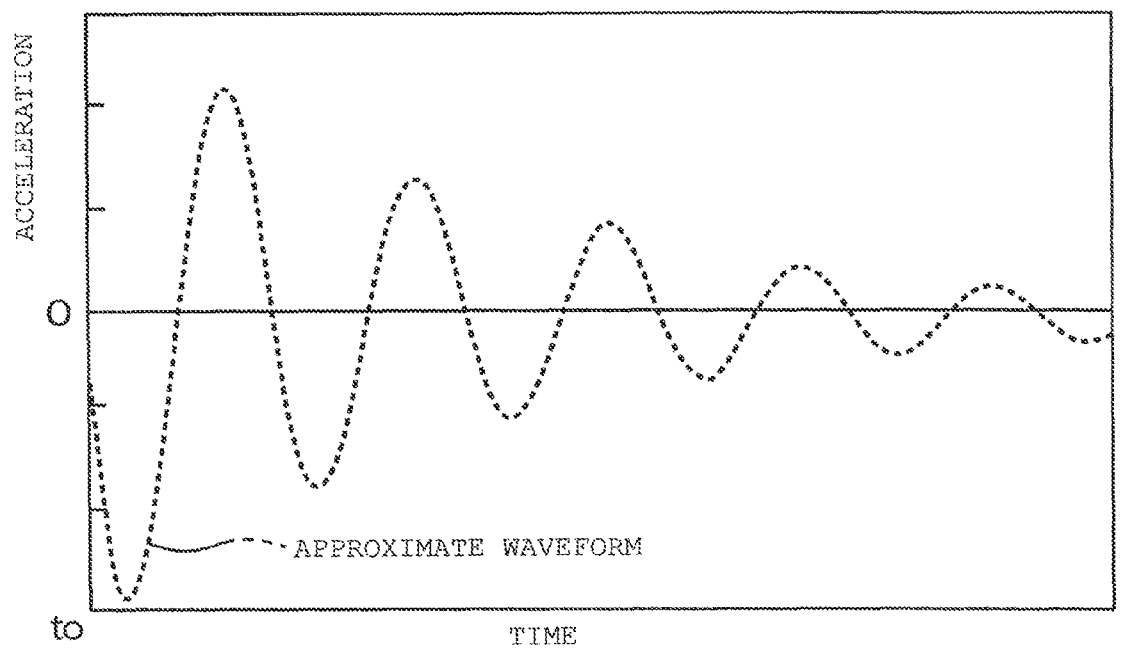
FIG. 4 is a graph illustrating an approximate waveform of an acceleration sensor upon going over a road step.

FIG. 3 is a schematic view illustrating a state of the front forks 6 and associated members upon going over a road step. Meanwhile, FIG. 4 is a graph illustrating an approximate waveform of an acceleration sensor upon going over a road step. Going over a road step is a traveling state in which an acceleration higher than that upon collision may possibly be generated. If such a going over state of a road step and a collision state can be discriminated from one another, then also it is possible to discriminate a collision state from a different rough road traveling state. Here, the acceleration sensors LGS and RGS are set such that they detect an acceleration generated toward the vehicle body rear side as a positive acceleration.

The front forks 6 define a structure corresponding to a cantilever fixed to the bottom bridge 5. Therefore, when the motorcycle goes over a road step S, not only the front forks 6 stroke in the contracting direction but also the front wheel WF is acted upon by a forward upward load, whereupon a load acts upon the axle 13 to deflect the entire front forks 6 forwardly upwardly, whereafter the front forks 6 generate attenuation vibrations toward convergence. In the graph of FIG. 4, a state is illustrated in which, when the motorcycle is brought into abutment with the road step at time t0, a high negative acceleration acts upon the acceleration sensors LGS and RGS and thereafter attenuation vibrations are generated toward convergence.

Figure 5:
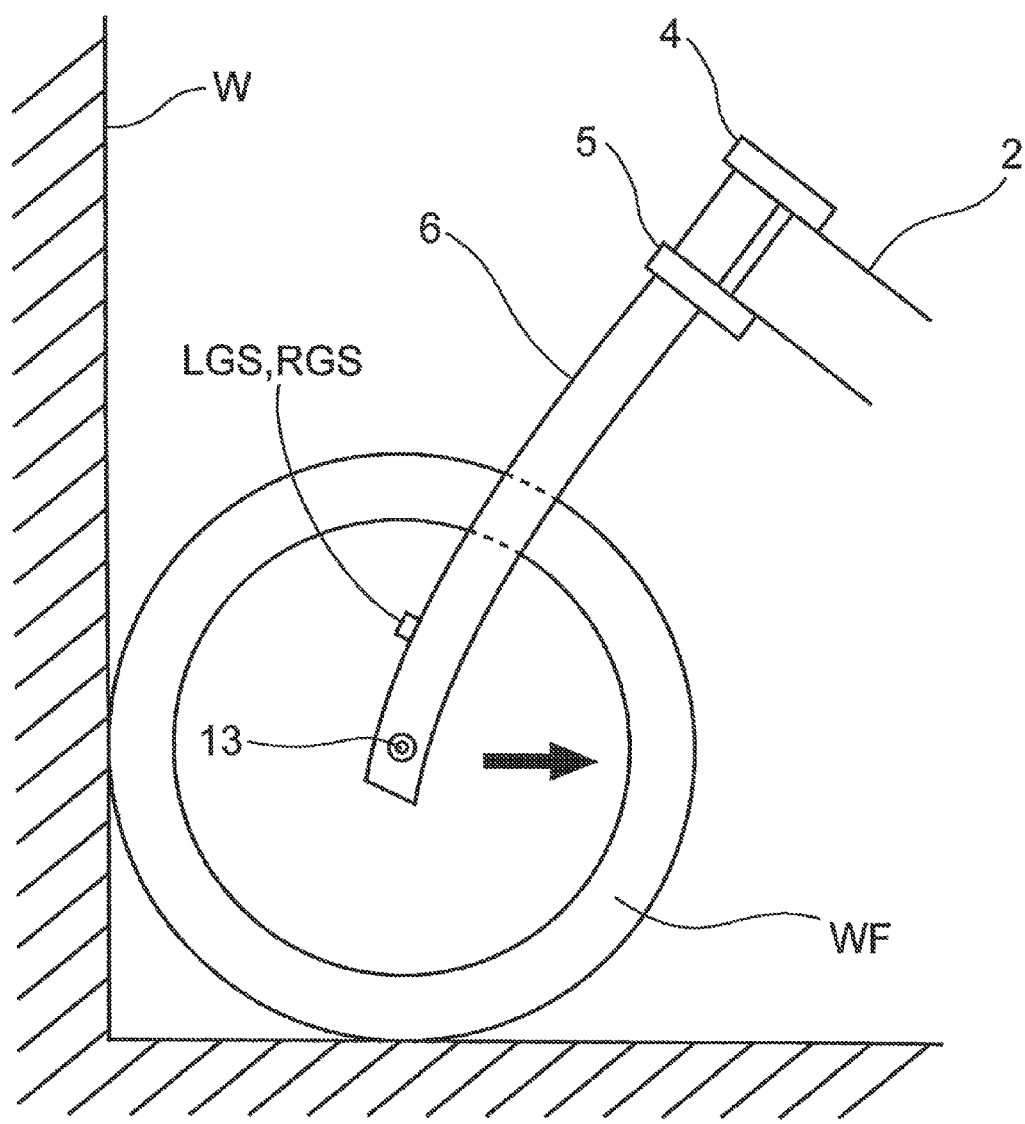
FIG. 5 is a schematic view illustrating a state of the front forks and associated members upon collision.
Figures 6, 7:
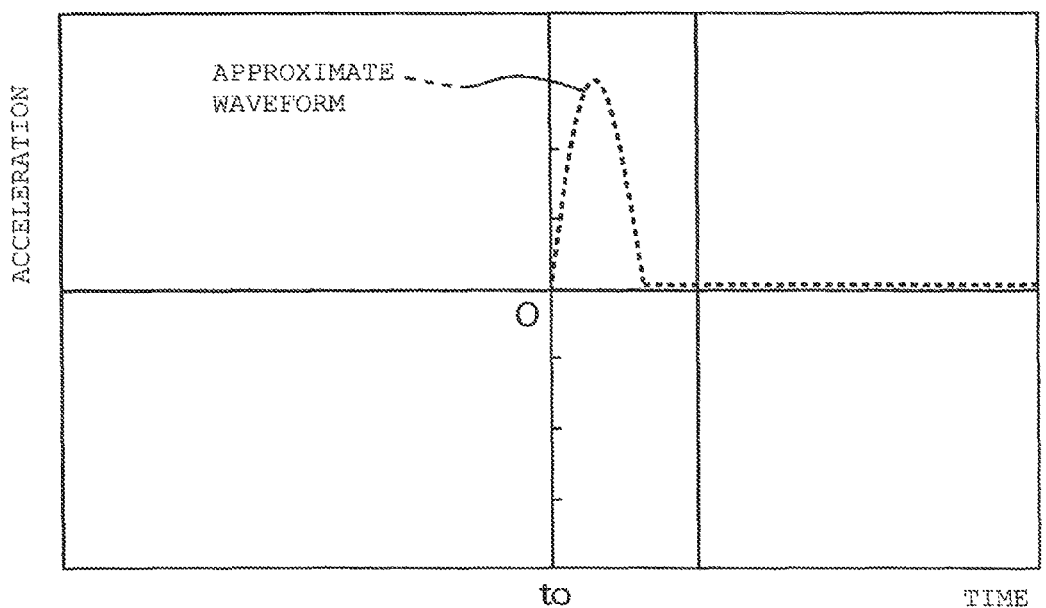
FIG. 6 is a graph illustrating an approximate waveform of the acceleration sensor upon collision.
FIG. 7 is a graph illustrating a method of discriminating between a collision and going over a road step based on an acceleration sensor signal.

FIG. 5 is a schematic view illustrating a state of the front forks 6 and associated members upon collision of the motorcycle. Meanwhile, FIG. 6 is a graph illustrating an approximate waveform of an acceleration sensor upon collision. According to the waveform illustrated in FIG. 6, a situation can be seen wherein, for example, when the motorcycle collides with a wall W as a fixed structure, the front wheel WF is acted upon by a load toward the rear, whereupon the front forks 6 are deflected rearwardly to generate a positive acceleration.

FIG. 7 is a graph illustrating a method of identifying a collision state and a road step going over state based on the acceleration sensor signal. Such a difference between a collision state and a road step going over state as illustrated in FIGS. 3 to 6 can be indicated more specifically on a graph whose axis of ordinate indicates the acceleration and whose axis of abscissa indicates the position.

The airbag start-up decision apparatus 11 according to the present embodiment carries out second order integration of output values of the acceleration sensors LGS and RGS to determine a value (position) of the graph on the axis of abscissa. The waveform upon road step going over indicates a waveform which principally varies between the second quadrant and the fourth quadrant of the graph because the acceleration indicates an attenuation vibration waveform (refer to FIG. 4).

In contrast, upon collision, the direction of the acceleration does not change after the collision, but only the positions of the acceleration sensors LGS and RGS increase toward the vehicle body front side, and therefore, the waveform of the positions appears only in the first quadrant. Accordingly, by applying a predetermined integration process to the output values of the acceleration sensors LGS and RGS, it is possible to specifically discriminate between a collision state and a road step going over state. Further, by applying a threshold value map M determined in advance to the first quadrant, execution of a safing decision with a higher degree of accuracy can be carried out.

In the following, a method for a safing decision is described in detail.

Figure 8:
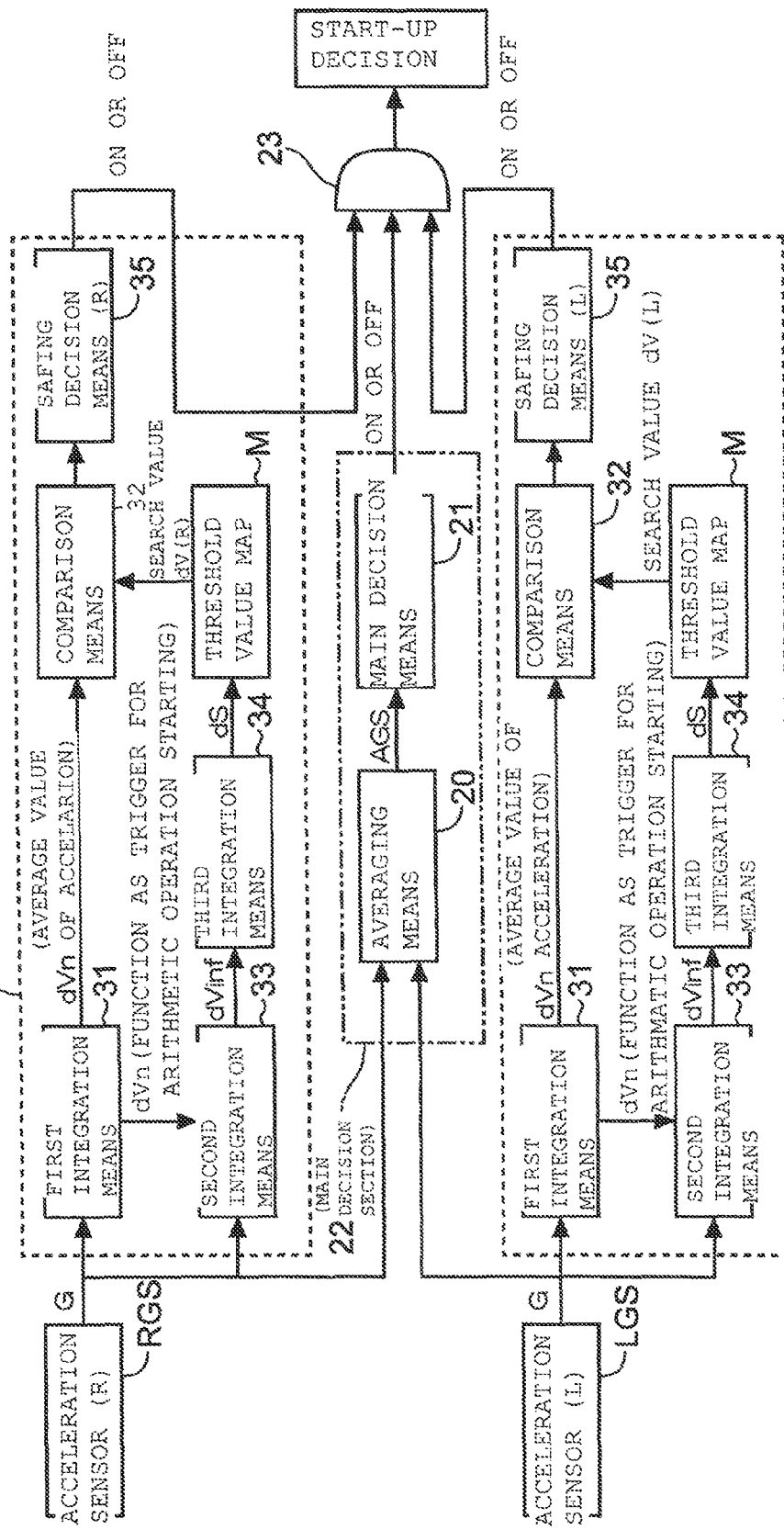
FIG. 8 is a block diagram showing a general configuration of the airbag start-up decision apparatus.

FIG. 8 is a block diagram showing a general configuration of the airbag start-up decision apparatus 11. The airbag start-up decision apparatus 11 according to the present invention includes a main decision section 22, an R side (right side) safing decision section 30R, an L side (left side) safing decision section 30L, and an AND circuit (AND gate) 23. Then, when decisions by the three decision sections are an on decision, the AND circuit 23 carries out an airbag start-up decision as an on decision, and in response to this, the airbag is started up.

The main decision section 22 includes averaging device or averaging means 20 for calculating an average value AGS of output values of the two acceleration sensors LGS and RGS, and main decision device or main decision means 21 for carrying out an on decision when the average value AGS exceeds an average value threshold value THR determined in advance.

Each of the left and right safing decision sections 30L and 30R includes safing decision device or safing decision means (L, R) 35 for carrying out a safing decision using an arithmetic operation value based on an output value of a corresponding one of the two acceleration sensors LGS and RGS and a threshold value map M determined in advance.

Since the R side safing decision section 30R and the L side safing decision section 30L have similar configurations, the configuration only of the R side safing decision section 30R is described. The R side safing decision section 30R includes first integrator or first integration means 31 that integrates the output value of the right side acceleration sensor RGS for a first integration interval T0 to obtain a first arithmetic operation value dVn, and second integrator or second integration means 33 that cumulatively integrates the output value of the right side acceleration sensor RGS to obtain a second arithmetic operation value dVinf. The R side safing decision section 30R further includes a third integrator or third integration means 34 that integrates the second arithmetic operation value dVinf for a third integration interval T1 to obtain a third arithmetic operation value dS as a second order integration value of the output value of the right side acceleration sensor RGS. Here, the second integration means 33 is set such that it starts the cumulative integration using it as a trigger that the first arithmetic operation value dVn exceeds a first predetermined value S1.

The R side safing decision section 30R uses a comparator or comparison means 32, which compares a map derivation value dV1 derived by applying the third arithmetic operation value dS to the threshold value map M with the first arithmetic operation value dVn to execute a safing decision. The right side safing decision device or right side safing decision means 35 carries out the safing decision as an on decision when the first arithmetic operation value dVn exceeds the map derivation value dV1.

With the configuration described above, only the paired left and right acceleration sensors attached to the front forks 6 can be used to execute an airbag start-up decision including a main decision and a safing decision, and an airbag start-up decision having a failsafe function can be achieved using a minimum number of acceleration sensors. Consequently, in the motorcycle that has a limited installation space, the degree of freedom in vehicle body layout can be raised, and the motorcycle is advantageous also in terms of cost. Further, precise discrimination of ordinary collision and any other event during traveling of the motorcycle (for example, continuous vibration during traveling, a high impact upon road step going over or traveling on a rough road, a spike-shaped sensor output by noise and so forth) can be implemented by appropriate setting of the first and third intervals of integration.

First, in the present embodiments, the third integration interval T1 is set to approximately one half a natural vibration period (1/f0) of the front forks 6. Consequently, for example, if the third integration interval T1 is excessively long, then it can be supposed that also vibration of the front forks 6 which is unnecessary for the collision decision is detected. However, this can be prevented.

The first integration interval T0 is set sufficiently shorter than the third integration interval T1. In particular, an output value of an acceleration sensor is second-order-integrated in a predetermined interval of integration to calculate a displacement. If this displacement is applied to a graph whose axis of abscissa indicates the displacement and whose axis of ordinate indicates the acceleration, then the waveform upon collision is a sine wave that exists only in the first quadrant. Since this waveform upon collision is much different from a waveform appearing in the second and fourth quadrants upon road step going over, unnecessary accumulation of integration values can be avoided to identify a collision state and a road step going over state or in a rough road traveling state in a short interval of integration.

Further, in the present embodiment, the average value threshold value THR used for the main decision is set higher than the output value of the right side acceleration sensor RGS having a magnitude with which the safing decision becomes an on decision. Therefore, although the safing decision is an on decision, if the main decision is not an on decision, namely, upon collision at a low speed, it is possible to prevent the airbag 12 from starting up.

In addition, even if one of the acceleration sensors LGS and RGS fails and outputs a high acceleration, which is not actually generated, the airbag start-up decision can be prevented from being made an on decision. In particular, if the right side acceleration sensor RGS suffers from a failure and continues to output a high value, then there is the possibility that not only the right side safing decision may be made an on decision but also the average value AGS may become a high value and also the main decision may be made an on decision. However, also in such a case, the safing decision on the left side based on the output value of the left side acceleration sensor LGS, which remains normal, remains an off decision but does not change to an on decision. Therefore, the airbag 12 is not started up because of an action of the AND circuit 23.

Further, in the present embodiment, the average value threshold value THR used for the main decision is set higher than the output values of the acceleration sensors LGS and RGS with a magnitude of which the safing decision becomes an on decision. Consequently, in such a case that a high impact is applied although it is of such a degree that inflation of the airbag 12 is not required as in the case of, for example, collision at a low speed, even if both of the right side safing decision and the left side safing decision become an on state, the main decision is not made an on decision. Consequently, the airbag 12 is not started up because of an action of the AND circuit 23.

In the following, a procedure of deciding whether a certain event is collision or any other event based on output values of the acceleration sensors LGS and RGS is described in more detail.

As described hereinabove, since the front forks 6 have a cantilever structure having a fixed end at the bottom bridge 5, they are deformed forwardly and rearwardly by an impact caused by irregularities of the road surface although the deformation is very small, and as a result, the front forks 6 make a rocking motion. Since the direction of this rocking motion coincides with the direction of the sensitivity axis (sensor axis) direction of the acceleration sensors RGS and LGS, the acceleration sensor outputs exhibit a vibration waveform (refer to FIG. 4). This vibration waveform depends not upon the irregularities of the road surface but upon a unique characteristic of the front forks 6, such as rigidity. This vibration can be represented in such a manner as given by the following expression (1):

[Expression 1]

$$m\ddot{x} = -c\dot{x} - kx \quad (1)$$

A real number solution of the expression (1) is represented by the following expression (2):

[Expression 2]

$$x(t) = e^{-\zeta\omega_0 t}\{a\sin(\sqrt{1-\zeta^2}\omega_0 t) + b\cos(\sqrt{1-\zeta^2}\omega_0 t)\} \quad (2)$$

where

[Expression 3]

$$c_0 = 2\sqrt{mk}$$

$$\omega_0 = \sqrt{k/m}$$

$$\zeta = c/c_0$$

(m: mass of a point mass, k: spring constant, c: attenuation coefficient)

The speed and the acceleration are represented by the following expressions (3) and (4), respectively.

[Expression 4]

$$\frac{dx(t)}{dt} = e^{-\zeta\omega_0 t}\{(-a\zeta - b\sqrt{1-\zeta^2})\sin(\sqrt{1-\zeta^2}\omega_0 t) + (-b\zeta + a\sqrt{1-\zeta^2})\cos(\sqrt{1-\zeta^2}\omega_0 t)\} \quad (3)$$

[Expression 5]

$$\frac{d^2 x(t)}{dt^2} = e^{-\zeta\omega_0 t}\omega_0^2\{(2a\zeta^2 - a + 2b\zeta\sqrt{1-\zeta^2})\sin(\sqrt{1-\zeta^2}\omega_0 t) + (2b\zeta^2 - b - 2a\zeta\sqrt{1-\zeta^2})\cos(\sqrt{1-\zeta^2}\omega_0 t)\} \quad (4)$$

Here, if it is assumed that, as an initial condition, an initial velocity is given by external force when the initial position is 0, then $$x(0) = b = 0 \quad [\text{Expression 6}]$$

$$\dot{x}(0) = a\sqrt{1-\zeta^2}\,\omega_0 = v_0$$

$$a = \frac{v_0}{\sqrt{1-\zeta^2}\,\omega_0}$$

are obtained. Accordingly, the position, speed and acceleration are represented by the following expressions (5), (6) and (7), respectively.

[Expression 7]

$$x(t) = \frac{v_0}{\sqrt{1-\zeta^2}\,\omega_0}e^{-\zeta\omega_0 t}\sin(\sqrt{1-\zeta^2}\,\omega_0 t) \quad (5)$$

[Expression 8]

$$\frac{dx(t)}{dt} = \frac{v_0}{\sqrt{1-\zeta^2}}e^{-\zeta\omega_0 t}\cos(\sqrt{1-\zeta^2}\,\omega_0 t + \varphi) \quad (6)$$

[Expression 9]

$$\frac{d^2 x(t)}{dt^2} = -\frac{v_0\omega_0}{\sqrt{1-\zeta^2}}e^{-\zeta\omega_0 t}\sin(\sqrt{1-\zeta^2}\,\omega_0 t + 2\varphi) \quad (7)$$

where $$\varphi = \tan^{-1}\left(\frac{\zeta}{\sqrt{1-\zeta^2}}\right) \quad [\text{Expression 10}]$$

Generally, in front fork vibration, the attenuation coefficient $\zeta$ is sufficiently low, and accordingly, also the phase difference can be ignored. Therefore, it can be recognized from the expressions (5) and (7) that the acceleration and the position have a relationship of an opposite phase relationship.

On the other hand, the acceleration sensor output upon collision exhibits a half sine waveform (refer to the approximate waveform of FIG. 6) and the third arithmetic operation value dS obtained by second order integration indicates a monotonic increase. Therefore, where the waveforms mentioned are represented in a graph wherein the axis of abscissa indicates the position and the axis of ordinate indicates the acceleration, the vibration waveform appears in the second and fourth quadrants and the collision waveform appears in the first quadrant (refer to FIG. 7).

From this characteristic, they can be distinguished from each other definitely by setting a threshold value map M representative of the third arithmetic operation value dS obtained by second order integration and the first arithmetic operation value dVn in the first quadrant.

In an actual airbag start-up decision, various factors act upon an ideal waveform. For example, a low acceleration upon ordinary acceleration or braking is accumulated by second order integration and makes a factor of causing a great error to occur with the third arithmetic operation value dS. Also a spike-shaped acceleration within a very short interval is sometimes detected. Accordingly, the theory based on the ideal waveform cannot be applied as it is to an actual airbag start-up decision.

Therefore, a position calculation technique for obtaining a more appropriate result is studied.

Since the object of the present invention resides in a collision decision, there is no necessity to detect such a position change as is caused by ordinary acceleration or deceleration, or in other words, as is caused by a comparatively low acceleration for a comparatively long period of time in comparison with that in a collision event.

Therefore, in the present invention, the integration for speed calculation is arithmetically operated only when an acceleration or a deceleration higher than a predetermined level is detected so that acceleration or deceleration or a position change by a comparatively low acceleration is not detected. For example, since generally the acceleration or deceleration of a motorcycle is approximately 1G in the maximum, a technique that an arithmetic operation is carried out only when an acceleration or deceleration higher than 2G is detected can be applied.

Further, as described hereinabove, the opportunity in which the speed arithmetic operation is carried out is restricted to a case in which the average output value satisfies the condition described hereinabove (for example, 2G or more) within a certain interval so that a speed arithmetic operation is not started readily in response to a spike-shaped acceleration or deceleration within a very short interval. It is to be noted that the stopping condition of the speed arithmetic operation is set after lapse of a fixed interval after it is decided that the condition is not detected any more.

Calculation means for an average output value in the certain first integration interval T0 is the first integration means 31 (refer to FIG. 8). This first integration means 31 successively repeats integration in a certain short interval of approximately 5 ms, and if the first arithmetic operation value dVn exceeds a certain fixed value, then the first integration means 31 signals a signal for starting an arithmetic operation of the second arithmetic operation value dVinf to the second integration means 33 which carries out integration for speed calculation. For example, if the threshold value is set to 2G for 5 ms integration, then 5×2=10 ms·G=0.01×9.8 m/sec=0.36 km/h.

Then, an arithmetic operation result of the second integration means 33 is integrated further to calculate a position change.

At the stage at which the second arithmetic operation value dVinf is calculated, the influence of a low acceleration or deceleration is eliminated to some degree. However, in the case of collision in which signaling of a safing signal is required, it is necessary to take it into consideration to prevent a decision result from being influenced by an acceleration or deceleration signal before the collision.

Therefore, also the third integration means 34 applies integration within a fixed interval width similarly to the first integration means 31. What is significant to the present invention resides in setting of the interval width of the first integration means 31.

Since the focused point of the present invention is that the vibration waveform has a phase opposite in acceleration and position, the interval widths of the third integration means 34 and the first integration means 31 are respectively set such that the third arithmetic operation value dS of the third integration means 34 and the first arithmetic operation value dVn of the first integration means 31 may have opposite phases to each other.

If the expression (7) given hereinabove represents the detection values of the acceleration sensors RGS and LGS and the expression (6) represents the integration value of the second integration means 33 while the integration interval width of the first integration means 31 is represented by T0 and the interval width of the third integration means 34 is represented by T1, then the first integration value of the first integration means 31 and the third integration value of the third integration means 34 are represented by the following expressions.

[Expression 11]

$$\Delta V_{T_0}(t) = \frac{v_0}{\sqrt{1-\zeta^2}} e^{-\zeta\omega_0 t} [\sin(\sqrt{1-\zeta^2}\,\omega_0 T_0)\sin(\sqrt{1-\zeta^2}\,\omega_0 t) - \{1 - \cos(\sqrt{1-\zeta^2}\,\omega_0 T_0)\}\cos(\sqrt{1-\zeta^2}\,\omega_0 t)] = \quad (8)$$

$$\sqrt{\frac{2\{1-\cos(\sqrt{1-\zeta^2}\,\omega_0 T_0)\}}{1-\zeta^2}}\,v_0$$

$$e^{-\zeta\omega_0 t}\left[\sqrt{\frac{\sin^2(\sqrt{1-\zeta^2}\,\omega_0 T_0)}{2\{1-\cos(\sqrt{1-\zeta^2}\,\omega_0 T_0)\}}}\sin(\sqrt{1-\zeta^2}\,\omega_0 t) - \sqrt{\frac{\{1-\cos(\sqrt{1-\zeta^2}\,\omega_0 T_0)\}^2}{2\{1-\cos(\sqrt{1-\zeta^2}\,\omega_0 T_0)\}}}\cos(\sqrt{1-\zeta^2}\,\omega_0 t)\right] =$$

$$\sqrt{\frac{2\{1-\cos(\sqrt{1-\zeta^2}\,\omega_0 T_0)\}}{1-\zeta^2}}\,v_0 e^{-\zeta\omega_0 t}$$

$$\left\{\sqrt{\frac{1+\cos(\sqrt{1-\zeta^2}\,\omega_0 T_0)}{2}}\sin(\sqrt{1-\zeta^2}\,\omega_0 t) - \sqrt{\frac{1-\cos(\sqrt{1-\zeta^2}\,\omega_0 T_0)}{2}}\cos(\sqrt{1-\zeta^2}\,\omega_0 t)\right\} =$$

$$\frac{2\left|\sin\left(\frac{\sqrt{1-\zeta^2}\,\omega_0}{2}T_0\right)\right|}{\sqrt{1-\zeta^2}}v_0 e^{-\zeta\omega_0 t}$$

$$\left\{\left|\cos\left(\frac{\sqrt{1-\zeta^2}\,\omega_0}{2}T_0\right)\right|\sin(\sqrt{1-\zeta^2}\,\omega_0 t) - \left|\sin\left(\frac{\sqrt{1-\zeta^2}\,\omega_0}{2}T_0\right)\right|\cos(\sqrt{1-\zeta^2}\,\omega_0 t)\right\}$$

[Expression 12]

$$\Delta S_{T_1}(t) = -\frac{v_0}{\sqrt{1-\zeta^2}\,\omega_0} \quad (9)$$

$$e^{-\zeta\omega_0 t}\left[\begin{array}{l}\{1 - e^{\zeta\omega_0 T_1}\cos(\sqrt{1-\zeta^2}\,\omega_0 T_1)\}\sin(\sqrt{1-\zeta^2}\,\omega_0 t) + \\ e^{\zeta\omega_0 T_1}\sin(\sqrt{1-\zeta^2}\,\omega_0 T_1)\cos(\sqrt{1-\zeta^2}\,\omega_0 t)\end{array}\right] \simeq$$

$$-\frac{v_0}{\sqrt{1-\zeta^2}\,\omega_0}$$

$$e^{-\zeta\omega_0 t}\left[\begin{array}{l}\{1 - \cos(\sqrt{1-\zeta^2}\,\omega_0 T_1)\}\sin(\sqrt{1-\zeta^2}\,\omega_0 t) + \\ \sin(\sqrt{1-\zeta^2}\,\omega_0 T_1)\cos(\sqrt{1-\zeta^2}\,\omega_0 t)\end{array}\right] =$$

$$-\frac{2\left|\sin\left(\frac{\sqrt{1-\zeta^2}\,\omega_0}{2}T_1\right)\right|}{\sqrt{1-\zeta^2}}\frac{v_0}{\omega_0}e^{-\zeta\omega_0 t}$$

$$\left\{\begin{array}{l}\left|\sin\left(\frac{\sqrt{1-\zeta^2}\,\omega_0}{2}T_1\right)\right|\sin(\sqrt{1-\zeta^2}\,\omega_0 t) + \\ \left|\cos\left(\frac{\sqrt{1-\zeta^2}\,\omega_0}{2}T_1\right)\right|\cos(\sqrt{1-\zeta^2}\,\omega_0 t)\end{array}\right\}$$

If the expressions above are rewritten, then $$\Delta V_{T_0}(t) = A(T_0)v_0 e^{-\zeta\omega_0 t}\sin\{(\sqrt{1-\zeta^2}\,\omega_0 t) - \alpha(T_0)\}$$ [Expression 13]

$$\Delta S_{T_1}(t) = -A(T_1)\frac{v_0}{\omega_0}e^{-\zeta\omega_0 t}\sin\{(\sqrt{1-\zeta^2}\,\omega_0 t) - \beta(T_1)\}$$

$$\sin\{\alpha(T_0)\} = \left|\sin\left(\frac{\sqrt{1-\zeta^2}\,\omega_0}{2}T_0\right)\right|\cos\{\alpha(T_0)\} =$$

$$\left|\cos\left(\frac{\sqrt{1-\zeta^2}\,\omega_0}{2}T_0\right)\right|$$

$$\sin\{\beta(T_1)\} = -\left|\cos\left(\frac{\sqrt{1-\zeta^2}\,\omega_0}{2}T_1\right)\right|\cos\{\beta(T_1)\} =$$

$$\left|\sin\left(\frac{\sqrt{1-\zeta^2}\,\omega_0}{2}T_1\right)\right|$$

At this time, within a range of $$0 \le \frac{\sqrt{1-\zeta^2}\,\omega_0}{2}t \le 2\pi$$ [Expression 14]

$$\alpha(t) = \begin{cases} \left(\frac{\sqrt{1-\zeta^2}\,\omega_0}{2}t\right) \\ \pi - \left(\frac{\sqrt{1-\zeta^2}\,\omega_0}{2}t\right) \\ \left(\frac{\sqrt{1-\zeta^2}\,\omega_0}{2}t\right) - \pi \\ 2\pi - \left(\frac{\sqrt{1-\zeta^2}\,\omega_0}{2}t\right) \end{cases}$$ [Expression 15]

$$\beta(t) = \begin{cases} \left(\frac{\sqrt{1-\zeta^2}\,\omega_0}{2}t\right) - \frac{\pi}{2} & \left(0 \le \frac{\sqrt{1-\zeta^2}\,\omega_0}{2}t < \frac{\pi}{2}\right) \\ \frac{\pi}{2} - \left(\frac{\sqrt{1-\zeta^2}\,\omega_0}{2}t\right) & \left(\frac{\pi}{2} \le \frac{\sqrt{1-\zeta^2}\,\omega_0}{2}t < \pi\right) \\ \left(\frac{\sqrt{1-\zeta^2}\,\omega_0}{2}t\right) - \frac{3}{2}\pi & \left(\pi \le \frac{\sqrt{1-\zeta^2}\,\omega_0}{2}t < \frac{3}{2}\pi\right) \\ \frac{3}{2}\pi - \left(\frac{\sqrt{1-\zeta^2}\,\omega_0}{2}t\right) & \left(\frac{3}{2}\pi \le \frac{\sqrt{1-\zeta^2}\,\omega_0}{2}t < 2\pi\right) \end{cases}$$

Since the ranges which can be taken by $\alpha(t)$ and $\beta(t)$ are $0\le\alpha(t)\le\pi/2$ and $-\pi/2\le\beta(t)\le 0$, respectively, in order to cause $\Delta VT0(t)$ and $\Delta ST1(t)$ to have opposite phases to each other, only $\alpha(T0)=\beta(T1)=0$ is a solution.

(T0, T1) with which this is satisfied are given by $$\frac{\sqrt{1-\zeta^2}\,\omega_0}{2}T_0 = (0, \pi, 2\pi, \ldots, n\pi)$$ [Expression 16]

$$\frac{\sqrt{1-\zeta^2}\,\omega_0}{2}T_1 = \left(\frac{1}{2}\pi, \frac{3}{2}\pi, \ldots, \left(\frac{1}{2}+n\right)\pi\right)$$

where, since $$A(t) = \frac{2}{\sqrt{1-\zeta^2}}\left|\sin\left(\frac{\sqrt{1-\zeta^2}\,\omega_0}{2}t\right)\right|$$ [Expression 17]

at $$T = \frac{2n\pi}{\sqrt{1-\zeta^2}\,\omega_0}$$ [Expression 18]

[Expression 19]

$$\Delta V_T(0)=0, \Delta S_T(t)=0$$

If

[Expression 20]

$$\alpha(T_0)=0$$

then $$T_0 = \frac{2n\pi}{\sqrt{1-\zeta^2}\,\omega_0}$$ [Expression 21]

and, since

[Expression 22]

$$\Delta V_{T_0}(t) \approx 0$$

T0 is set to a sufficiently low value. Meanwhile, as regards

[Expression 23]

$$\beta(T_1)=0$$

it can assume a value of $$T_1 = \frac{1}{\sqrt{1-\zeta^2}\,\omega_0}\left(\frac{1}{2}+n\right)\pi$$ [Expression 24]

Since the third integration interval T1 of the third integration means 34 preferably is short to the utmost, n is set to 0 so that T1 becomes approximately one half the natural vibration frequency (approximately ½ the natural vibration frequency (1/f0)). By this, the first arithmetic operation value dVn of the first integration means 31 and the third arithmetic operation value dS of the third integration means 34 come to have opposite phases to each other.

Figure 9:
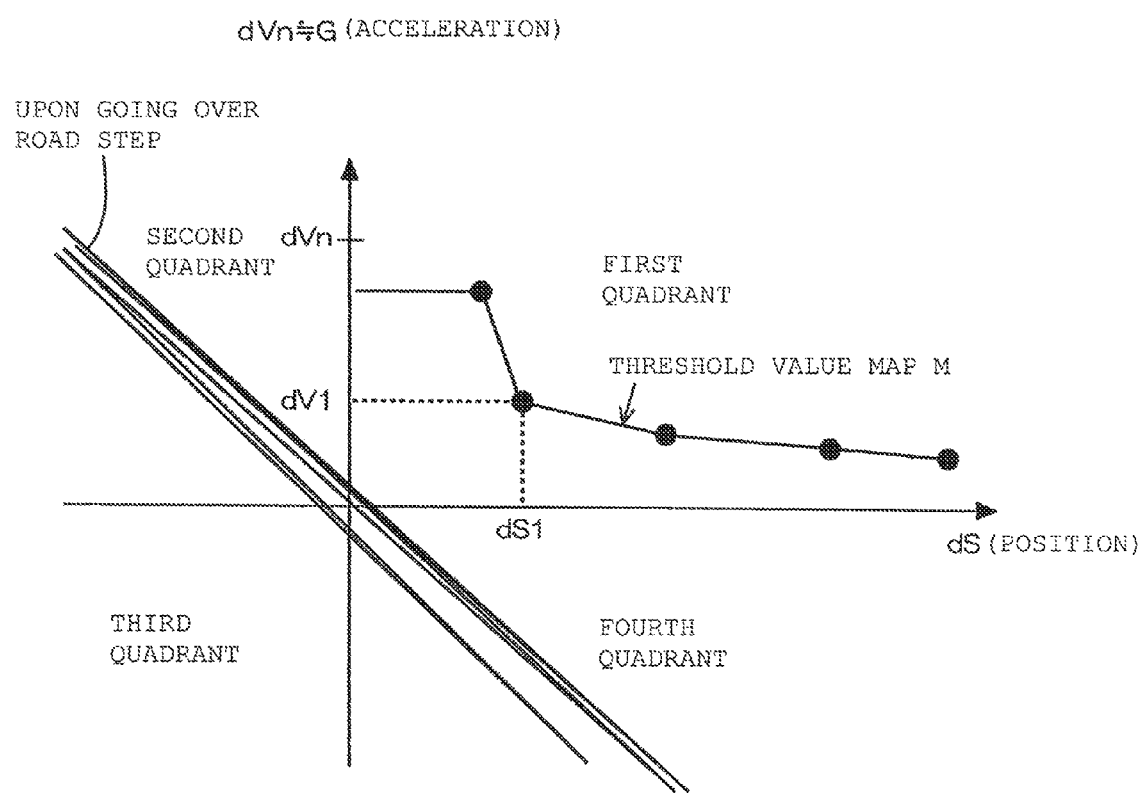
FIG. 9 is a graph illustrating a technique of carrying out a safing decision using a threshold map.

FIG. 9 is a graph illustrating a technique for carrying out a safing decision using a threshold value map M. As described hereinabove, the comparison means 32 carries out comparison between the map derivation value dV1 derived by applying the third arithmetic operation value dS to the threshold value map M and the first arithmetic operation value dVn calculated by the first integration means 31 to carry out a safing decision. In particular, a dS–dV threshold value map M is provided in advance, and an arithmetic operation result of second order integration, namely, a map derivation value dV1 corresponding to a third arithmetic operation value dS1, is determined using the threshold value map M. This map derivation value dV1 is compared with the first arithmetic operation value dVn, and if dVn>dV1, then the safing decision becomes an on decision.

At this time, the first arithmetic operation value dVn compared with the map derivation value dV1 conceptually is an average value of the acceleration, and in the graph of FIG. 9, the first arithmetic operation value dVn is represented as dVn=G for the convenience of description. This is because, when an actual traveling state is considered, it is necessary to cope with a spike-shaped signal input. Therefore, signal waveforms from the acceleration sensors RGS and LGS are integrated for an interval of a short time width to determine an average acceleration within a predetermined period of time thereby to remove high frequency components. In other words, it can be regarded that the first integration means 31 is integration means which additionally has a low-pass filter function.

The second integration means 33 is set such that it starts cumulative integration using it as a trigger that the absolute value of the first arithmetic operation value dVn by the first integration means 31 exceeds a threshold value determined in advance (first predetermined value S1). The second integration means 33 is further set such that it stops the integration when the first arithmetic operation value dVn remains lower than the first predetermined value S1 for a fixed period of time. If total integration of the acceleration is executed in this technique of integration from starting of integration to stopping of the integration, then since also a low acceleration (for example, upon acceleration after start-up, upon braking or the like), which is unnecessary for the collision decision is integrated, an integration error appears. Therefore, in the present embodiment, the threshold value is set in advance to a value which does not appear within an ordinary traveling range (for example, to an average acceleration 2G) to avoid that a low acceleration which is not necessary for a collision decision is integrated.

It is to be noted that, since the vibration frequency to be discriminated is known in advance as described hereinabove, the third integration means 34 integrates an output of the second integration means 33 for a predetermined interval width (T1) set to one half a predetermined vibration frequency.

As described hereinabove, according to the airbag start-up decision apparatus according to the present invention, the safing decision means 35 is configured to execute a safing decision using the first integration means 31 for integrating output values of the acceleration sensors LGS and RGS for a first integration interval T0 to obtain a first arithmetic operation value dVn, the second integration means 33 for starting cumulative integration of the output values of the acceleration sensors LGS and RGS using it as a trigger that the first arithmetic operation value dVn exceeds the first predetermined value S1 to obtain a second arithmetic operation value dVinf, the third integration means 34 for integrating the second arithmetic operation value dVinf for a third integration interval T1 to obtain a third arithmetic operation value dS as a second order integration value of the output values of the acceleration sensors LGS and RGS, and the comparison means 32 for comparing a map derivation value dV1 derived by substituting the third arithmetic operation value dS into the threshold value map M with the first arithmetic operation value dVn. The main decision means 21 carries out a main decision as an on decision if the average value AGS exceeds an average value threshold value THR determined in advance. The safing decision means 35 carries out a safing decision as an on decision if the map derivation value dV1 exceeds a map derivation value dV1. When both of the main decision and the safing decision are carried out as an on decision, a start-up decision of the airbag 12 is carried out as an on decision. Therefore, a start-up decision configured from the main decision and the safing decision can be executed using only the paired left and right acceleration sensors LGS and RGS attached to the front forks 6. Further, by setting of the first and third integration intervals, an ordinary collision and any other event during traveling of the motorcycle can be discriminated precisely.

It is to be noted that the structure and the attachment method of the acceleration sensors, the shape and the structure of the airbag, the structure and the vehicle body attachment position of the airbag start-up decision apparatus, setting of the first and third integration intervals, setting of the threshold value map and so forth are not limited to those of the embodiment described above but can be modified in various manners. The airbag start-up decision apparatus according to the present invention can be applied not restrictively to the motorcycle presented in the embodiment but also to various vehicles such as various two-wheel vehicles such as a sport vehicle, a scooter type vehicle and so forth and three-wheel or four-wheel vehicles of the saddle type and other vehicles.

DESCRIPTION OF REFERENCE SYMBOLS

1 . . . Motorcycle, 6 . . . Front fork, 12 . . . Airbag, 20 . . . Averaging means, 21 . . . Main decision means, 22 . . . Main decision section, 23 . . . AND circuit (AND gate), 31 . . . First integration means, 32 . . . Comparison means, 33 . . . Second integration means, 34 . . . Third integration means, 35 . . . Safing decision means, RGS . . . Right side acceleration sensor, LGS . . . Left side acceleration sensor, M . . . Threshold value map

What is claimed is:

1. An airbag start-up decision apparatus for a motorcycle that carries out a start-up decision of whether or not an airbag provided on the motorcycle is to be started up, wherein
    an acceleration, which is an output value of an acceleration sensor attached to the motorcycle is second-order-integrated, for a predetermined integration interval to calculate a displacement, and based on a fact that, upon application to a graph wherein the displacement is taken on the axis of abscissa and the output value is taken on the axis of ordinate, a waveform obtained upon collision exists only in the first quadrant while a waveform obtained in any other case than collision appears in a quadrant different from the first quadrant, it is decided whether or not a state of the motorcycle is that upon collision or that in any other case than collision,
    wherein the waveform obtained upon collision exists only in the first quadrant while a waveform obtained upon going over a road step and upon traveling on a rough road appears in the second and fourth quadrants, it is decided whether or not the state of the motorcycle is that upon collision or that upon going over a road step or upon traveling on a rough road,
    wherein the airbag start-up decision apparatus includes:
    a main decision device for carrying out a main decision based on the output value of the acceleration sensor,
    a safing decision device for carrying out a safing decision based on the output value of the acceleration sensor, and
    the start-up decision of the airbag being carried out based on the main decision and the safing decision.

2. The airbag start-up decision apparatus according to claim 1, wherein
    the airbag start-up decision apparatus includes:
    two acceleration sensors attached one by one to left and right front forks that support a front wheel of the motorcycle for rotation thereon,
    the main decision device for carrying out the main decision based on an average value of output values of the two acceleration sensors, and the safing decision device for carrying out the safing decision using an arithmetic operation value based on the output values of the two acceleration sensors and a threshold value map determined in advance; and the safing decision device is configured to execute the safing decision using:

a first integrator for integrating the output values of the acceleration sensors for a first integration interval to obtain a first arithmetic operation value, a second integrator for starting cumulative integration of the output values of the acceleration sensors using it as a trigger that the first arithmetic operation value exceeds a first predetermined value to obtain a second arithmetic operation value, a third integrator for integrating the second arithmetic operation value for a third integration interval to obtain a third arithmetic operation value as a second order integration value of the output values of the acceleration sensors, and a comparator for comparing a map derivation value derived by substituting the third arithmetic operation value into the threshold value map and the first arithmetic operation value with each other;

the main decision device carrying out the main decision as an on decision when the average value exceeds an average value threshold value determined in advance;

the safing decision device carrying out the safing decision as an on decision when the first arithmetic operation value exceeds the map derivation value; and the start-up decision of the airbag being carried out as an on decision when both of the main decision and the safing decision are carried out as an on decision.

3. The airbag start-up decision apparatus according to claim 1, wherein the airbag start-up decision apparatus includes:

two acceleration sensors configured from a left side acceleration sensor attached to the left side one of the front forks and a right side acceleration sensor attached to the right side one of the front forks, and the left side acceleration sensor and the right side acceleration sensor are attached such that a sensor axis which is a detection direction of the acceleration thereby is directed in a substantially vehicle body forward and backward direction perpendicular to an axial line of the front forks.

4. The airbag start-up decision apparatus according to claim 3, wherein the safing decision device is provided for each of the two acceleration sensors which carry out a safing decision with regard to the output values of the two acceleration sensors.

5. The airbag start-up decision apparatus according to claim 2, wherein the third integration interval is set to approximately one half a natural vibration frequency of the front forks.

6. The airbag start-up decision apparatus according to claim 2, wherein the first integration interval is sufficiently shorter than the third integration interval.

7. The airbag start-up decision apparatus according to claim 2, wherein the average value threshold value used for the main decision is set higher than the output values of the acceleration sensors of a magnitude with which the safing decision becomes an on decision.

8. The airbag start-up decision apparatus according to claim 2, wherein the two acceleration sensors are configured from a left side acceleration sensor attached to the left side one of the front forks and a right side acceleration sensor attached to the right side one of the front forks, and the left side acceleration sensor and the right side acceleration sensor are attached such that a sensor axis which is a detection direction of the acceleration thereby is directed in a substantially vehicle body forward and backward direction perpendicular to an axial line of the front forks.

9. The airbag start-up decision apparatus according to claim 2, wherein the safing decision device is provided for each of the two acceleration sensors which carry out a safing decision with regard to the output values of the two acceleration sensors.

* * * * *